United States Patent [19]

Nagai et al.

[11] Patent Number: 4,822,541

[45] Date of Patent: Apr. 18, 1989

[54] METHOD OF PRODUCING A POROUS CERAMIC PANEL

[75] Inventors: Satoru Nagai, Toki; Kazuo Imahashi, Chofu; Yoshio Nagaya, Toki; Shigeo Yoshida, Shiga; Satoshi Kitagawa, Shiga; Takatoshi Miyazawa, Shiga, all of Japan

[73] Assignees: National House Industrial Co., Ltd., Osaka; Takasago Industry Co., Ltd., Gifu; Intelhearts Co., Ltd., Tokyo, all of Japan

[21] Appl. No.: 107,070

[22] Filed: Oct. 13, 1987

[30] Foreign Application Priority Data

May 22, 1987 [JP] Japan ............................... 62-126778
Aug. 4, 1987 [JP] Japan ............................... 62-194840

[51] Int. Cl.4 ....................... B29C 43/26; B29C 43/46; B29C 67/20; B29C 71/02

[52] U.S. Cl. ....................................... 264/42; 264/235; 264/346

[58] Field of Search ........................ 264/42, 45.5, 46.2, 264/43, 44, 235, 346; 423/328

[56] References Cited

U.S. PATENT DOCUMENTS

| | | | |
|---|---|---|---|
| 1,818,101 | 8/1931 | Slide | 264/43 |
| 1,877,137 | 9/1932 | Lee | 264/43 |
| 2,325,903 | 8/1943 | Blair et al. | 264/45.5 |
| 2,341,059 | 2/1944 | Parsons | 25/143 |
| 2,998,501 | 8/1961 | Edberg et al. | 264/46.2 X |
| 3,240,846 | 3/1966 | Voelker | 264/46.2 |
| 3,383,449 | 5/1968 | Müller | 425/328 X |
| 3,564,085 | 2/1971 | Schickedanz | 264/46.2 X |
| 3,585,014 | 6/1971 | Malesalc | 264/43 X |
| 3,657,036 | 4/1972 | Mullenhoff et al. | 264/46.2 X |
| 3,863,908 | 2/1975 | Charpentier | 264/46.24 |
| 3,895,086 | 7/1975 | Berner | 264/46.24 |
| 3,929,947 | 12/1975 | Schwartz et al. | 264/42 |
| 3,977,931 | 8/1976 | Peille | 264/46.2 X |
| 3,981,949 | 9/1976 | Ryan et al. | 264/45.5 X |
| 3,984,195 | 10/1976 | del Carpio | 264/46.2 X |
| 4,083,324 | 4/1978 | Krumweide | 264/42 X |
| 4,093,686 | 6/1978 | Briston et al. | 264/45.5 |
| 4,096,303 | 6/1978 | Doerfling | 264/45.5 X |
| 4,141,944 | 2/1979 | Anstadt et al. | 264/45.5 |
| 4,154,785 | 5/1979 | Inui et al. | 264/45.5 |
| 4,155,693 | 5/1979 | Raley | 425/328 X |

FOREIGN PATENT DOCUMENTS

| | | |
|---|---|---|
| 2124146 | 12/1971 | Fed. Rep. of Germany . |
| 53-50759 | 12/1978 | Japan . |
| 58-167478 | 10/1983 | Japan . |
| 423590 | 4/1964 | Switzerland . |
| 2175840A | 12/1986 | United Kingdom . |

OTHER PUBLICATIONS

Soviet Inventions Illustrated, Section P,Q, week 83/31, Sep. 14, 1983; Derwent Publications Ltd., London p. 64; SU-961 960.

*Primary Examiner*—Jan H. Silbaugh
*Assistant Examiner*—Karen D. Kutach
*Attorney, Agent, or Firm*—Armstrong, Nikaido, Marmelstein & Kubovcik

[57] ABSTRACT

Inorganic raw materials are heated and pressed in a kiln to produce a porous ceramic panel. The foaming body is first-pressed in a foaming step, and after the foaming step the first-pressed foamed body is second-pressed, in order to obtain superior dimensional accuracy and surface smoothness. The panels are applicable, for instance, to interior or exterior materials of various kinds of buildings such as prefabricated houses and shops.

18 Claims, 7 Drawing Sheets

METHOD OF PRODUCING A POROUS CERAMIC PANEL

BACKGROUND OF THE INVENTION

The present invention relates to a method of producing a porous ceramic panel, and more particularly to a method of producing a porous ceramic panel capable of preventing the generation of open void cells in the panel by pressing and integrating it, and capable of giving a superior surface smoothness to the panel.

Though porous ceramic panels have not yet been used widely, the application thereof for prefabricated houses and the like has been examined because of their lightness, easiness to be handled, and superiority in thermal-insulation, fire-resistance, durability and the like.

Main raw materials for producing the above porous ceramic panels are, in general, natural glass, artificial glass, porous volcanic rock, igneous rock, sedimentary rock, tuff, and the like. The porous ceramic panels are produced by foaming the above raw materials and simultaneously pressing on an upper surface of the foaming body by a belt, or by pressing panels after the foaming step, so as to fuse cells together and shape the foaming or foamed body.

In the case of using a belt, a foaming body in a heating and foaming step (or burning step) is generally pressed by a belt 26 continuously and flatly from an above direction.

In the case of using a roll or rolls, the pressing is generally carried out by at least one pair of rolls which are arranged over and under a burned or foamed body (hereinafter referred to "foamed body") as shown in Japanese Examined Patent Publication No. 50759/1978. The above-mentioned double-type rolls comprise, as shown in FIG. 13, upper rolls **28*a* and lower rolls 28*b* arranged over and under the foamed body, respectively. The foamed body after being foamed and softened is pressed by the upper rolls 28*a* and lower rolls 28*b***, whereby both surfaces of the foamed body is provided with uniform sintered surface.

However, in the above-mentioned conventional methods, the porous ceramic panel is pressed and shaped only in a foaming step (in the case of using a belt), or only after the foaming step (in the case of using rolls). In a result, these methods have several problems in the integration, surface smoothness and the like of the produced porous ceramic panels.

That is to say, in the case of using a belt, a porous ceramic panel is pressed in a heating and foaming step. Since heat-foamable inorganic raw materials are foamed within a limited space between a lower conveying belt and an upper pressing belt, the thickness of the foaming body beween rolls disposed in the pressing belt becomes thick due to the foaming pressure. A wave pattern corresponding to a roll pitch is formed on an upper surface of the foaming body. It is not easy to delete the wave pattern, because the foaming body moves in a kiln with a pressing belt and it is pressed by the rolls through the pressing belt. The wave pattern was a serious defect of the products. Further, it is impossible to give a desirable relief pattern on the surface of the products.

On the other hand, in accordance with a method using rolls, a foamed body after foaming step is pressed and integrated by the rolls. After a layer consisting of pelletized foamable raw materials is heated and foamed to expand in such a manner that foamed particles contact one another in a point, an upper surface of the layer is pressed by rolls. In that case, a roll pressure diffuses and does not reach the central portion of the foamed body because of softness thereof. Accordingly, voids formed at cell-interface cannot be broken. Further, the shape of foamed particles at an upper surface cannot be made smooth. Thus, many voids at cell-interface remain unbroken, and they communicate one another to generate open void cells. In a result, there is caused a problem that the heat-insulation and the waterproofness of the panels deteriorate. It is difficult to obtain a good surface smoothness only by the pressing using rolls.

It is an object of the present invention to provide a method of producing porous ceramic panels having superior integration, dimensional accuracy, and surface smoothness.

SUMMARY OF THE INVENTION

In accordance with the present invention, there is provided a method of producing porous ceramic panels wherein foamable inorganic raw material are heated and pressed in a kiln to produce porous ceramic panels, characterized in that an upper surface of a foaming body is first-pressed in a foaming step, and after the foaming step an upper surface of the first-pressed foamed body is second-pressed.

The first-pressing is preferably carried out by a belt disposed parallel to a carrying passage in the kiln or by a suitable number of pressing rolls disposed vertically to the carrying passage. The second-pressing is preferably carried out by a suitable number of pressing rolls disposed vertically to the carrying passage.

According to a method of the present invention, there can be obtained the porous ceramic panels having superior dimensional accuracy and surface smoothness in comparison with those produced in accordance with conventional methods, because, in the method of the present invention, rough dimensional accuracy and surface smoothness are ensured by the first-pressing and the finish can be carried out by the second-pressing in an annealing step. Open void cells are not formed at cell-interface since voids at cell-interface are satisfactorily broken, whereby there can be obtained porous ceramic panels having superior heat-insulation and water-proofness.

DETAILED DESCRIPTION

Figure 1:
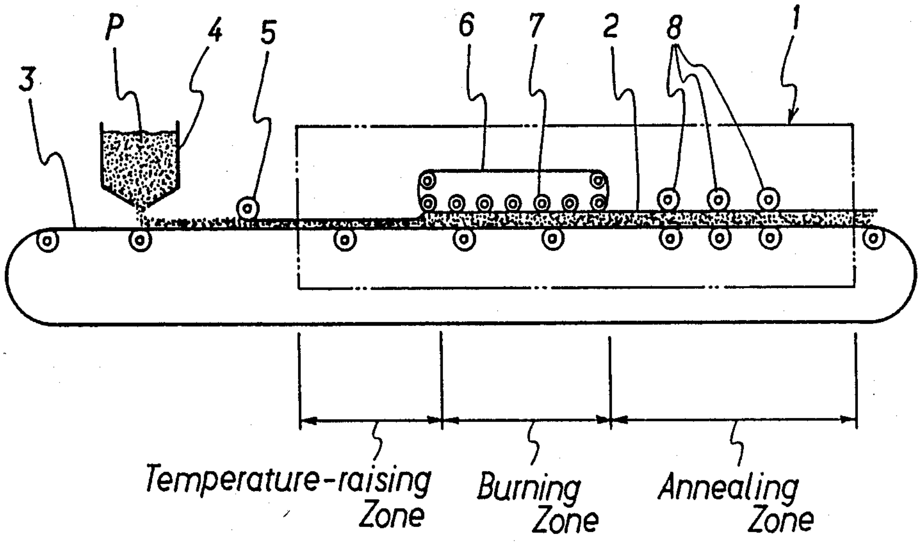
FIG. 1 is a schematic illustration showing an embodiment of a kiln used in a method of producing porous ceramic panels of the present invention.

There is now explained a method of producing porous ceramic panels of the present invention based on the accompanying drawings. In the drawings, the same numeral indicates the same element.

FIG. 1 is a schematic illustration showing an embodiment of a kiln used in a method of producing porous ceramic panels of the present invention.

In FIG. 1, numeral 1 is a kiln wherein an endless belt conveyor for conveying a porous ceramic panel 2. It is preferable to use a mesh-like belt in order to uniformly diffuse volatile components during the foaming and to ensure the uniform heat transfer on both top surface and bottom surface of the panel. A stainless-mesh belt with ceramic coating thereon, a ceramic belt and the like are preferably employable.

As foamable inorganic raw materials, pellets made of a mixture comprising natural glass, artificial glass, porous volcanic rock, igneous rock, tuff, and the like are used. The pellets P are supplied on the belt conveyor 3 in a suitable amount from a supply hopper 4. Supplied pellets are leveled by a pre-roll 5 to form a layer having appropriately uniform thickness. The layer consisting of pellets is then moved into the kiln 1. The temperature of pellets is elevated in a temperature-elevating zone and the pellets are heated and foamed in a succeeding burning zone. The preferable degree of temperature-elevation varies depending on particle size, proportion, and the like of raw materials. The temperature-elevation might be, for example, 80° C. per minute. However, in the present invention, it is not particularly limited. The burning-temperature also varies like temperature-elevation depending on particle size, foaming temperature, uniformity in pore-size of raw materials, and the like. It is approximately from 700° C. to 1100° C. Further, the burning time is suitably determined according to the melting or fusing temperature, foaming velocity, uniformity in pore-size of raw materials, and the like.

The method of the present invention, as described above, is characterized by a step for pressing and shaping a foaming and foamed porous ceramic panel. That is, the method of the present invention is characterized in that porous ceramic panels are firstly pressed during a foaming step to ensure the rough dimensional accuracy in a direction of the thickness of the panel and surface smoothness, and secondly pressed during an annealing step to obtain desirable dimensional accuracy and surface smoothness. Thus, there can be easily obtained superior dimensional accuracy and surface smoothness in comparison with conventional methods, wherein the pressing is carried out only in a foaming step or only after the foaming step, because in the method of the present invention porous ceramic panels are pressed both in the foaming step and after the foaming step (i.e. annealing step). Further, the method effectively solves the problem of the deterioration of waterproofness and heat-insulation due to the formation of open void cells.

The first-pressing is carried out, as is stated above, to ensure the rough dimensional accuracy and surface smoothness during the foaming step, using an endless belt 6 such as stainless band steel and stainless mesh belt disposed parallel to a carrying passage in a kiln, or rolls disposed vertical to the carrying passage. From a viewpoint of continuously and flatly pressing a foaming body and sufficiently breaking the void cell-interface, it is preferable to employ a belt in the first-pressing. In the case of using a roll or rolls, on the other hand, the coating or application of parting agent is not necessary, a pattern of mesh does not appear on the surface of the porous ceramic panel (a pattern of mesh is likely to remain on the surface of the panel when using a mesh belt), and scales do not generate. Further rolls have superior durability in comparison with a belt. Thus, it is preferable to employ rolls, in the first-pressing, of which pitch (roll interval) is designed as small as possible, because there can be avoided the surface trouble due to scales of the mesh belt, parting agent and the like, though it needs high fuel cost in the case of rolls because the inside of rolls is cooled by air to prevent the adhesion of the panel.

In the case of employing a belt, the length of the belt is approximately from 2 to 6 meters, though the length thereof is not particularly limited in the present invention. Within the belt 6, there are disposed rolls 7 for pressing the foaming body at suitable intervals, for example, of 250 mm to 300 mm pitch. The rolls 7 are made of cast steel and the like and have diameters of about 160 mm$\phi$.

The panel after being foamed is secondly pressed by rolls 8 in an annealing step. The diameter, material, pitch and the like of the rolls 8 are not particularly limited. The same kind of rolls as rolls 7 in the belt 6 described above can also be used in the second-pressing. The number of rolls 8 is not limited in the present invention, so even one roll can perform the object of the present invention. In the case of employing a plurality of rolls, however, there can be obtained the products having more accurate dimension and smoothness since the porous ceramic panel 2 can be pressed by stages.

During the second-pressing, a desirable relief pattern might be given on to a surface of a shaped body by pressing the body with an emboss roll having a desirable relief pattern.

Figure 4:
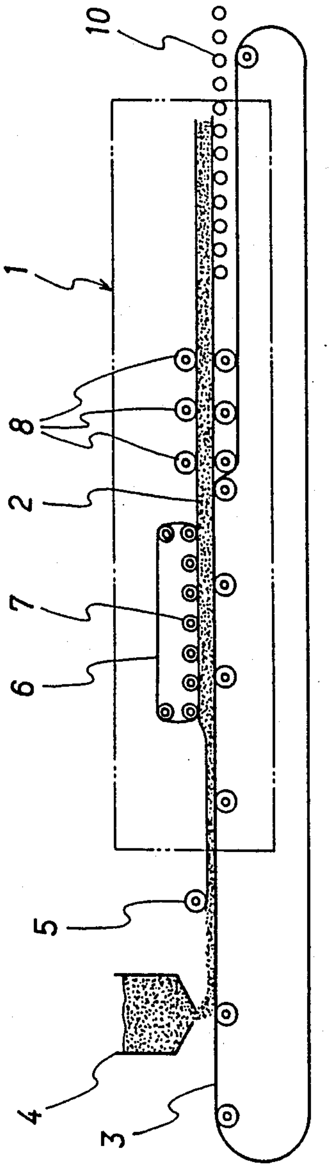
FIG. 4 is a schematic illustration showing another embodiment of a kiln used in a method of producing porous ceramic panels of the present invention.

In the kiln of FIG. 1, the porous ceramic panel is secondly pressed through the belt conveyor under the porous ceramic panel. When the porous ceramic panel is directly pressed without using a belt conveyor, as shown in FIG. 4, the dimensional accuracy in a direction of thickness of the panel can be further improved and a porous ceramic panel having superior smoothness on both surfaces can be obtained. In the kiln of FIG. 4, a belt conveyor 3 separates from a porous ceramic panel 2 just before the first roll of pressing rolls 8 for second-pressing, and runs outside the rolls. In FIG. 4, numeral 10 are carrying rolls for moving the porous ceramic panel to an exit of the kiln 1.

Next, there are explained various embodiments of the method of the present invention.

First of all, the first embodiment is explained.

In this embodiment, the second-pressing is carried out by means of a pressing and cooling means which is disposed at an annealing zone in a kiln and directly contacts both top and bottom surfaces of a foamed panel so as to quench a foamed panel. Thereafter, the surface temperature of the quenched foamed panel is raised again in an atmosphere of the annealing zone. As a result, strain stress in the foamed panel caused by the quenching is relaxed and foamed panels having superior properties can be obtained. Further, production rate, i.e. productivity can be improved thanks to the quenching.

That is, when a surface of a porous ceramic panel is quenched during an annealing step, the temperature of the surface and in the vicinity of the surface of the panel sharply falls, so that the temperature distribution of the panel between the surface and in the vicinity of the surface and the inner portion thereof becomes non-uniform. Accordingly, there is generated tensile stress at the surface and its vicinity of the panel and compressive stress in the inner portion of the panel. Because of these stresses, there is caused a problem that the porous ceramic panels are damaged.

In particular, thermal strain stress is likely to generate from annealing point to strain point, so that the temperature non-uniformity in a direction of thickness of the panel amounts to not less than several °C. and the panel is damaged by the thermal stress.

In order to prevent the damage of porous ceramic panels due to the above-mentioned thermal stress, there has been hitherto employed a method of cooling a porous ceramic panel wherein air is blown to both upper surface and bottom surface of the panel. In the method, cooling time is designed to be kept long in order to maintain the uniformity of temperature distribution in the panel. The panel is thus gradually cooled.

However, in the above cooling method using air blow, it takes much time to cool the porous ceramic panel because it is impossible to employ a high cooling velocity, of which fact interferes with the improvement in production efficiency of porous ceramic panels. This problem becomes more remarkable and serious in the case of thick panels, because the thicker the panels become, the larger a proportion of cooling time to total production time becomes.

The conventional methods also have problems that dimensional accuracy in a direction of thickness of porous ceramic panels lowers and good smoothness on the bottom surfaces of the panels cannot be expected, since the panels are pressed through a belt conveyor under the panels.

In the first embodiment of the present invention, a foamed porous ceramic panel is secondly pressed by pressing and cooling rolls and bonded in addition to the first-pressing during a foaming step. In that case, the second-pressing is carried out by the direct contact between the porous ceramic panel and rolls as rapidly as possible so long as a temperature of the inner portion of the porous ceramic panel 2 does not fall to less than a softening point. The thermal strain stress generated on a surface of the panel due to the quenching is relaxed by passing the panel in a strain temperature atmosphere after the quenching, so that the panel is not subjected to the damage.

In the conventional cooling method using air blow, the air blown to the porous ceramic panel 2 not only cools the panel but also diffuses into a kiln, so that an atmosphere temperature in the kiln between the cooling position and an exit of the kiln is lowered. Accordingly, the once cooled porous ceramic panel is annealed in an atmosphere temperature without being reheated, and is carried out from the kiln. However, the cooling in the first embodiment is a contact cooling by the pressing and cooling rolls, whereby there is generated no flow of cold air in the kiln. Therefore, the temperature of the surface and its vicinity of the porous ceramic panel 2 after being quenched can again rise by the atmosphere temperature, so that the thermal strain stress due to the quenching can be relaxed. That is, after the quenching step by the pressing and cooling rolls, the surface of the panel is solidified by the contact quenching and tensile stress is generated, while a temperature of the inner portion of the panel remains at softening point or annealing point. The thermal strains stress is relaxed because the panel is re-heated and the heat in the inner portion of the panel transfers to the surface of the panel to promote uniformity of the temperature.

As a cooling source of the pressing and cooling rolls, fluid such as water or air can be suitably used. The surface temperature of the rolls might be determined in consideration of temperature, viscosity, production rate, and the like of the porous ceramic panel 2. The surface temperature can be controlled by adjusting the flow rate of cooling water or cooling air, whereby it is maintained at a constant temperature. In the present embodiment, the adjustment of surface temperature of the rolls can, of course, be carried out by some suitable controlling method other than the above-mentioned method.

In the present embodiment, the porous ceramic panel 2 is, as shown in FIG. 4, second-pressed and cooled by the pressing and cooling rolls, and thereafter is moved to an exit of the kiln on carrying rolls 10.

During the above movement on the carrying rolls 10, the surface temperature of the porous ceramic panel 2 is again raised by the atmosphere temperature in the kiln, so that the thermal strain stress caused by the quenching is relaxed.

An atmosphere temperature in the kiln is preferably from 350° C. to 900° C. from a viewpoint of the annealing and re-heating of the porous ceramic panel 2. The most preferable atmosphere temperature within the above range is determined depending on several conditions such as kinds of raw materials of the porous ceramic panel 2 and a moving velocity of the belt conveyor 3. In order to accomplish the above-mentioned object of this embodiment, the atmosphere temperature is required to be set up more than a transition temperature of the porous ceramic panel 2. The most preferable surface temperature of the rolls is also determined depending on several conditions such as kinds of raw materials of the porous ceramic panel and a moving velocity of the belt conveyor 3.

In the first embodiment, a porous ceramic panel is quenched in such a manner that a temperature of the inner portion of the panel is lowered to not more than a softening temperature. In that case, there is generated tensile stress at a surface and its vicinity of the panel and compressive stress at inner portion of the panel, because a temperature of the surface portion of the panel drops faster than the inner portion of the panel.

After the quenching is carried out, when the porous ceramic panel 2 is in an atmosphere of which temperature is higher than a softening temperature, the thermal stress is relaxed and disappears in a short time in spite of the difference of temperature between the surface portion and inner portion of the panel. Such a high temperature is not, however, preferable since it takes much time to anneal the panel. In the present embodiment, the porous ceramic panel is cooled safely and in a short time by re-heating the panel in an atmosphere of transition temperature.

Next, there is explained the second embodiment of the present invention wherein a porous ceramic panel has a multilayer structure.

The porous ceramic panel in the present invention might be composed of one layer comprising foamed inorganic raw materials of the same components, or two or more than two layers comprising foamed inorganic raw materials of the different components one another. When the multilayer structure is employed, there can be easily and surely obtained multilayer porous ceramic panel having a plurality of functions, without employing conventional complicated step of pasting materials of different kinds together with adhesives. In a result, production cost can be reduced. Further, there can be solved a problem that an adhesive layer is peeled off due to the deterioration thereof.

Several kinds of multilayer structure are employable in the second embodiment.

In the case of a porous ceramic panel consisting of, for example, the first layer comprising foamed raw materials having a large foaming expansion ratio, and the second layer comprising foamed raw materials having a small foaming expansion ratio, the first layer comprising foamed raw materials having a large foaming expansion ratio has superior water absorption and release and sound absorption thanks to a large number of open void cells, while the second layer comprising foamed raw materials having a large foaming expansion ratio has superior water-proofness, moisture-proofness, stain-resistance dust and dirt adhere with difficulty to the surface of the panel, surface smoothness and surface glossiness thanks to fine closed void cells. Suitable combination is employable in the embodiment according to uses. Examples of such combination are, for instance, A/B, A/B/A and the like where A is a layer of large foaming expansion ration and B is a layer of small foaming expansion ratio. The multilayer porous ceramic panel of the second embodiment is required to have a layer having open void cells on at least one side of the panel. The above combinations are applicable to several kinds of multilayer porous ceramic panels described hereinafter.

With respect to the change of particle size, in the case of using raw materials having large particle size, there can be obtained a layer having superior water absorption and release, and sound absorption thanks to the existence of open void cells among foamed particles. On the other hand, in the case of using raw materials having small particle size, there can be obtained a layer having superior water-proofness, moisture-resistance, stain-resistance, smoothness, and glossiness thanks to the formation of fine closed void cells.

In the surface portion including the above open void cells, a superior effect on sound absorption is obtainable since fine open void cells in the surface portion effectively absorbs sound energy. In addition, a good water absorption and release is obtainable since the open void cells allow the existence of water therein. In that case, when raw materials having small particle size or foaming expansion ratio is used in portions other than the above surface portion, such portions can be expected to have high hardness, superior sound insulation, and no gas permeability. Thus, the obtained multilayer porous ceramic panels are suitably applicable to various kinds of use such as interior or exterior materials of housings.

The distinguished feature of the second embodiment is that multilayer porous ceramic panels having a plurality of different functions can be produced, without using adhesives, by laminating two or more layers having different particle size, foaming expansion ratio, and the like and simultaneously burning the layers. Further effects are obtainable by the simultaneous burning of two or more layers each comprising different raw materials. That is, there has been a problem that white raw materials, which is necessary to the coloring of porous ceramic panels, are hard to get since the employable white raw materials are limited. In the second embodiment of the present invention, however, the stable supply of raw materials and cost reduction become possible, because it is possible to use white raw materials only in the surface layer to be colored and other suitable raw materials, which is economical and easy to get, in the portion other than the surface layer.

Next, there is explained the third embodiment of the present invention.

In the method of the present invention, decorative porous ceramic panels can be easily produced by coating or applying a colored layer on a base layer comprising foamable inorganic raw materials through a screen having suitably shaped openings, and second-pressing a surface of the foamed body with an emboss roll having recess portions corresponding to the colored layer in such a manner that the colored layer is made projecting or protruding.

Figure 5:
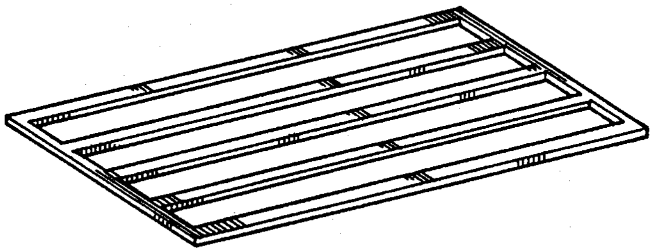
FIGS. 5 to 6 are perspective views of screens used in producing multilayer porous ceramic panels.
Figure 6:
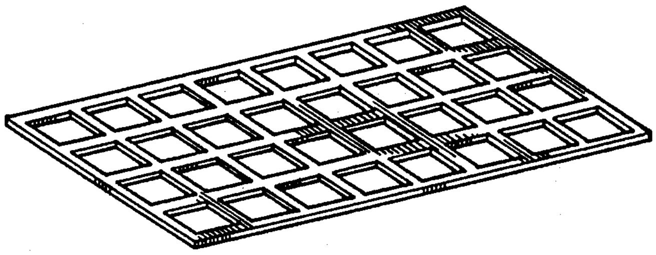

A colored layer 15 is formed by coating colored foamable inorganic raw materials on a base layer 14 (such a layer comprising pellets made of a mixture of natural glass, artificial glass, porous volcanic rock, igneous rock, tuff, and the like) through a screen as shown in FIGS. 5 to 6. The pattern of the colored layer 15 is changeable by changing the shape of openings made on the screen 11. Striped pattern, check-striped pattern, polka-dotted pattern, pattern of wood grain, and the like can be given to the colored layer 15. The kind of color, raw materials, and thickness of the colored layer 15 are not particularly limited in the third embodiment and therefore can be suitably selected. The colored layer 15 might be different from the base layer 14 in only its color, or in both its color and foaming expansion ratio. The foaming expansion ratio can be controlled by changing the components of raw materials.

The base layer on which the colored layer is laminated or coated is carried into the kiln 1, raised in temperature in the temperature-raising zone, and then heated and foamed in the burning zone. The foamed and softened porous ceramic panel 2 is pressed and shaped by the belt 6 and emboss rolls 8.

Figure 2:
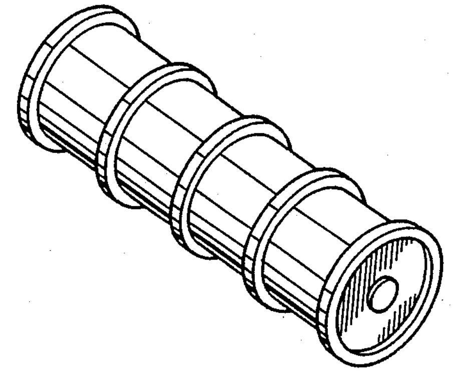
FIGS. 2 to 3 are schematic perspective views of rolls having embossed sections.
Figure 3:
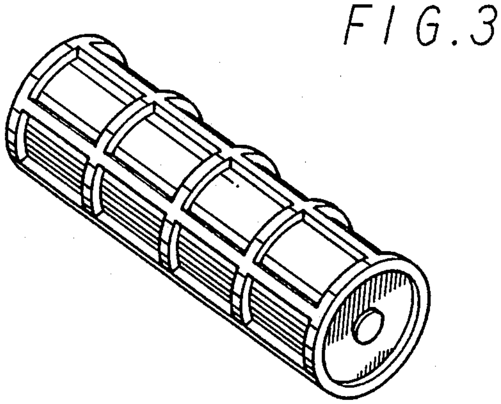

In the third embodiment, the emboss rolls 8 for second-pressing have such shape on their surface that corresponds to a pattern of the colored layer 15, in order to distinguish the pattern of the colored layer 15. That is, when a colored layer having a striped pattern parallel to a longitudinal direction of the base layer is coated on the base layer, there is used a roll (see FIG. 2) which is so worked that a portion contacting the colored layer is caved and a portion contacting the base layer other than the colored layer is protruded. When a colored layer having a check-striped pattern is coated on the base layer, such an emboss roll as shown in FIG. 3 is used.

The number of emboss rolls is not limited in the third embodiment. Further, it is of course possible to use flat rolls and emboss rolls in the second-pressing in such a manner, for example, that the first half of the rolls are flat rolls and the latter half of the rolls are emboss rolls.

Figure 7:
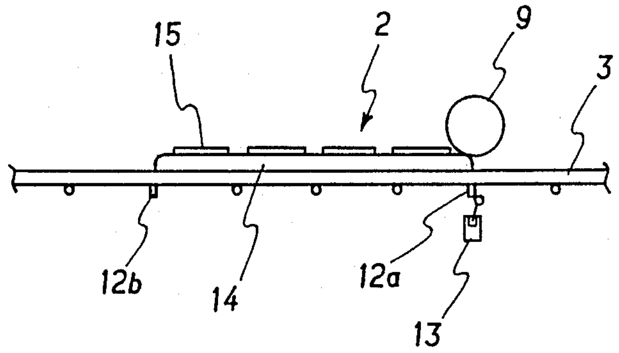
FIGS. 7 to 8 are views explaining a method of positioning pressing emboss rolls.
Figure 8:
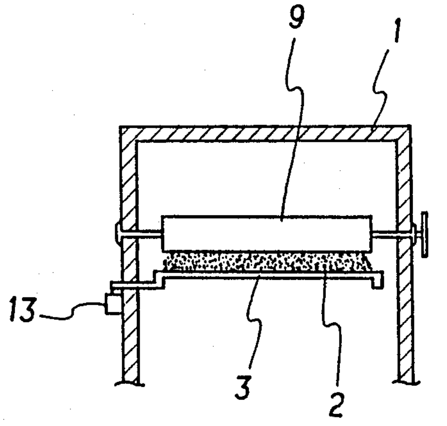

The positioning of the colored layer 15 and a caved portion or recess of the emboss roll can be conducted by, for example, detecting a detection block **12*a* for the porous ceramic panel attached to a bottom surface of the belt conveyor by means of a limit switch 13 of which arm is extended from outside the kiln as shown in FIGS. 7 to 8, and rotating the emboss roll 9 at the same speed as that of belt conveyor 13 or stopping the emboss roll 9. In FIG. 7, numerals 12*a* and 12*b* are a block for starting a roll and a block for stopping a roll respectively. In the case of employing the above-mentioned positioning method, it is necessary beforehand to laminate raw materials between the detection blocks 12***a* and 12*b* when raw materials are supplied on the belt conveyor.

Next, there are explained the fourth and fifth embodiments of the present invention.

In the fourth embodiment of the present invention, the second-pressing is carried out by at least one emboss roll which is so worked that a portion corresponding to edge portions of the porous ceramic panel is protruded. On the other hand, in the fifth embodiment of the present invention, the first-pressing is carried out by at least one flat roll or a belt so as to make the whole surface of the porous ceramic panel smooth, and thereafter the second-pressing is carried out by at least one emboss roll which is worked in the same manner as in the fourth embodiment. As a result, the working of cutting edge portions of the porous ceramic panel is omitted and the strength and fine spectacle of the panel are improved.

Hitherto, it has been required to form a recess at a joint portion of two adjoining panels and put a caulking material to the recess, or to use a metal joiner or a joiner made of synthetic resin at the joint portion, in order to beautifully finish the joint portion of the porous ceramic panel. The treatment of the joint portion is conducted at present by the second working such as cutting, shaving and planing after pressing and shaping the porous ceramic panel.

When the second working such as cutting is applied to the porous ceramic panel after once pressing it, however, there is caused problems that not only the surface condition of the cut portion differs from that of un-cut portion but also the cut portion presents non-uniform surface condition. Further, a thin cut portion is lowered in its strength and therefore is likely to cause a crack or chip. The second working still further cause a problem that the manufacturing process becomes complicated due to the additional second working such as cutting and accordingly the production cost is increased.

According to the fourth and fifth embodiments of the present invention, there can be obtained a porous ceramic panel having stable strength, of which edge portions have the same surface condition as that of un-pressed or un-worked portion. The porous ceramic panel is pressed and shaped by emboss rolls having a protruded portion corresponding to edge portions of the porous ceramic panel during a foaming step and an annealing step (the fourth embodiment); or is made smooth in the whole surface thereof by flat rolls or a belt during a foaming step and thereafter is pressed and shaped in the edge portions by emboss rolls having a protruded portion corresponding to edge portions of the panel during an annealing step (the fifth embodiment). The number of emboss rolls used in the present embodiment is not particularly limited. Both one roll and more than one roll might be employed in the present embodiment. In the case of using a plurality of emboss rolls, the last emboss roll might be so shaped that a portion corresponding to edge portions of the porous ceramic panel 2 is made protruding, or all the emboss rolls might be shaped as stated above and be designed to gradually press the edge portions.

Figure 9:
FIGS. 9 to 11 are views showing several shapes of edge portions of porous ceramic panels.
Figure 10:
Figure 11:
Figure 12:
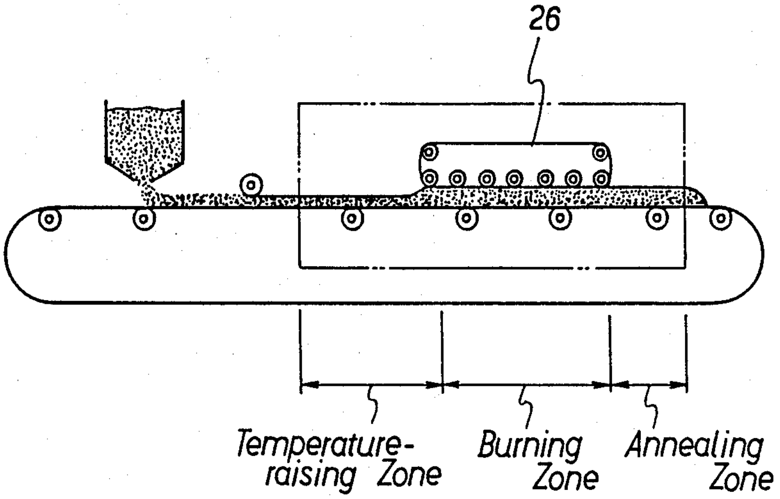
FIG. 12 PRIOR ART
FIGS. 12 to 13 are schematic illustration of conventional kilns wherein the pressing and shaping are carried out by a belt or rolls respectively.
Figure 13:
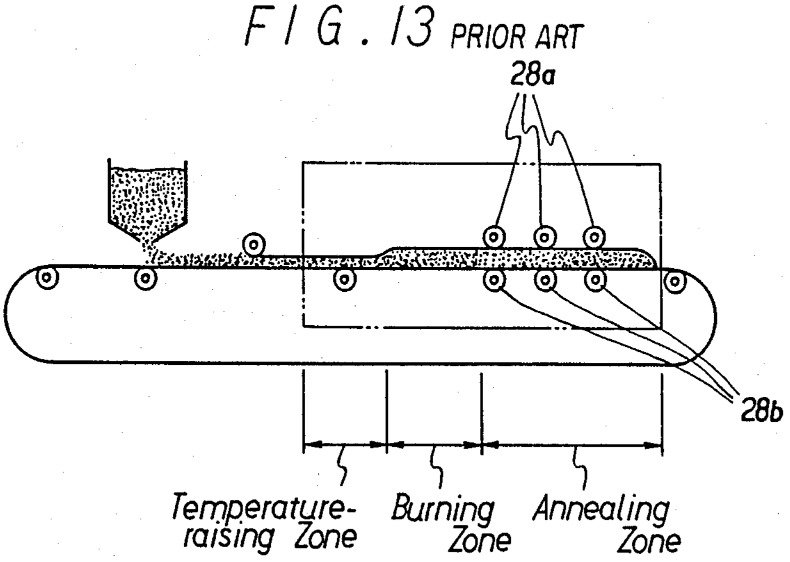
FIG. 13 PRIOR ART

The edge portions of the porous ceramic panel can be so shaped to form, for instance, a step-like portion (see FIG. 9), a taperd portion (FIG. 10), a rounded portion (FIG. 11) and the like.

According to the fifth embodiment, clearer shape than in the fourth embodiment can be given to the edge portions of the panel. In also the fifth embodiment, the number of emboss rolls in the annealing step as well as in the foaming step is not particularly limited like in the fourth embodiment.

Though ordinary emboss rolls are usable in the emboss rolls for the second-pressing, the use of quenching rolls can effectively avoid the loss of glossiness caused by the adhesion of mold release agent such as almina.

The edge portions of the porous ceramic panel shaped according to the method of the fourth or fifth embodiment is pressed and shaped, so that the strength thereof is not lowered in spite of small thickness. The shape of emboss rolls is suitably selected to obtain desirable edge portion, therefore is not particularly limited in the fourth and fifth embodiments of the present invention.

Next, there is explained a method of the present invention based on the following Examples. It should be noted that the scope of the present invention is not limited thereto.

EXAMPLE 1

A mixture consisting of 62.5% of acid clay (% by weight, hereinafter the same), 10.0% of silica, 12.0% of soda ash, 7.0% of soda nitrate, 5.0% of dolomite, 5.0% of limestone, and 0.5% of SiC was dry-ground in by a pot mill to produce grounded material having a grain size of 44 μm/96% (not less than 96% by weight of ground material pass through a 44 μm mesh). Thereafter, pellets having a grain diameter of 1 to 2 mm were produced by a pan-type pelletizer.

The pellets were supplied on a heat-resistant mesh belt to form a layer of 13 mm thick, and carried into a continuous kiln, of which temperature in the burning zone was kept at 900° C., at a speed of 28 cm/min. The pellets were foamed and pressed between the mesh belt and a heat-resistant conveyor disposed parallel to and 15 mm away from the mesh belt (first-pressing). The conveyor was driven at the same speed as the mesh belt. Then, the upper surface and bottom suface of the porous ceramic panel were quenched in the quenching zone by the direct contact of three pairs of rolls cooled to 650° to 680° C. by water (second-pressing). The panel was transferred to an annealing zone of which atmosphere temperature was kept at 530° to 550° C. in order to make the heat in an inner portion of the panel transmit to a surface portion of the panel.

The surface smoothness of the obtained panel was observed by the naked eye. The bending strength (based on JIS A 1408) and water absorption (based on item 6.4 of JIS A 5403) were measured. The results are summarized in Table 1.

TABLE 1

| | Surface Smoothness | Bending Strength [kg/cm$^2$] | Water Absorption**** [%] |
|---|---|---|---|
| Ex. 1 | * | 28 | 1 |
| Ex. 2 | Same as above | 27.5 | — |
| Ex. 3 | Same as above | 22 | 20 |
| Com. Ex. 1 | ** | 25 | 1.5 |
| Com. | *** | 21.5 | 6 |

TABLE 1-continued

| | Surface Smoothness | Bending Strength [kg/cm²] | Water Absorption**** [%] |
|---|---|---|---|
| Ex. 2 | | | |

*The whole surface is smooth. Recesses of about 0.2 mm deep are found here and there at void cell-interface. But they do not stand out.
**Though the surface of the panel is smooth since the void cell-interface is crushed, protruded portions appear at intervals of about 23 mm. Difference of elevation is 0.5 mm.
***Though the surface of the panel is smooth as a whole, the foamed particles are not crushed and remain their shape. The void cell-interface is hardly crushed. The deepest recess is as much as 3 mm, so that there are generated open void cells in the inner portion of the panel.
****The size of test piece was 100 mm × 100 mm × 15 mm. The test piece was dipped in water for 24 hours.

The test piece was dipped in water for 24 hours. The water absorption was determined according to the following formula $$\text{Water Absorption (\%)} = \frac{W_1 - W_0}{W_0} \times 100$$

where:
$W_0$ is weight of dried test piece, and
$W_1$ weight of test piece after 24 hour's dipping

EXAMPLE 2

A mixture consisting of 67.7% of acid clay, 17.6% of soda ash, 5.6% of potassium sulfate, 5.6% of dolomite, 0.5% of SiC, and 3.0% of ZnO was dry-ground by a pot mill to produce grinded material having a grain size of 44 μm/96%. Thereafter, pellets having a grain diameter of 1 to 2 mm were produced by a pan-type pelletizer.

The pellets were supplied on a heat-resistant mesh belt to form a layer of 13 mm thick, and carried into a continuous kiln, of which temperature in the burning zone was kept at 880° C., at a speed of 28 cm/min. The pellets were foamed and pressed between the mesh belt and twenty rolls (diameter: 160 mm, surface temperature: 800° to 820° C.) provided vertical to and 16 mm away from the mesh belt (first-pressing). The rolls were disposed at intervals of 30 mm.

Then, the upper surface and bottom surface of the porous ceramic panel were quenched in the quenching zone by the direct contact of three pairs of rolls cooled to 600° to 620° C. by water (second-pressing). The quenching rolls were disposed 15 mm away from the mesh belt. The panel was transferred to an annealing zone of which atmosphere temperature was kept at 530° C. to 550° C.

The same items as in Example 1 were observed or measured. The results are summarized in Table 1.

EXAMPLE 3

A mixture consisting of 71% of feldspar from Fukushima, 10% of soda ash, 4% of soda nitrate, 5% of dolomite, 10% of zirconite, and 2% of coloring agent (% of coloring agent is based on the total weight of the feldspar, soda ash, soda nitrate, dolomite, and zirconite) consisting of 70% of M-142 (green pigment), 10% of M-5000 (blue pigment), and 20% of M-309 (brown pigment) all of which were available from Nitto Sangyo Kabushiki Kaisha was dry-ground by a pot mill to produce ground material having a grain size of 44 μm/96%. Thereafter, pellets used for a surface layer having a grain diameter of 0.5 to 1 mm were produced by a pan-type pelletizer.

Next, a mixture consisting of 71% of acid clay, 10% of soda ash, 4% of soda nitrate, 5% of dolomite, and 10% of zirconite was dry-grinded by a pot mill to produce ground material having a grain size of 44 μm/96%. Thereafter, pellets used for a base layer having a grain diameter of 1 to 2 mm were produced by a pan-type pelletizer.

The pellets for a base layer were supplied on a heat-resistant mesh belt of 110 cm wide to form a base layer of 8 mm thick. On the base layer, the pellets for a surface layer were succeedingly supplied to form a surface layer of 5 mm thick. The base layer and surface layer were carried into a continuous kiln, of which temperature in the burning zone was kept at 900° C., at a speed of 28 cm/min. The pellets were foamed and pressed between the conveying mesh belt and a heat-resistant pressing mesh belt disposed parallel to and 16 mm away from the conveying mesh belt. The pressing mesh belt was driven at the same speed as the conveying mesh belt.

Then, the upper surface and bottom surface of the porous ceramic panel comprising two different layers, i.e. the base layer and surface layer, were quenched in the quenching zone by the direct contact of three pairs of rolls cooled to 650° C. to 680° C. by water (second-pressing). The panel was transferred to an annealing zone of which atmosphere temperature was kept at 530° C. to 550° C. in order to make the heat in an inner portion of the panel transmit to a surface portion of the panel. The surface layer of the obtained panel was superior in sound absorption and water permeability. The base layer was, on the other hand, superior in sound-insulation, water-proofness, and heat-insulation.

The same items as in Example 1 were observed or measured. The results are summarized in Table 1.

The normal incident absorption coefficient of panels obtained in Example 1 and Example 3 was measured. The results are summarized in Table 2.

TABLE 2

| | Normal Incident Absorption Coefficient | | | |
|---|---|---|---|---|
| | 125 [Hz] | 250 | 500 | 1000 |
| Ex. 1 | 0.04 | 0.05 | 0.12 | 0.28 |
| Ex. 3 | 0.054 | 0.06 | 0.096 | 0.38 |

COMPARATIVE EXAMPLE 1

The procedure of Example 1 was repeated except that the second-pressing by the quenching rolls was not carried out and the foamed panel was annealed in the kiln at an atmosphere temperature of 400° C. to 600° C.

The same items as in Example 1 were observed or measured. The results are summarized in Table 1.

COMPARATIVE EXAMPLE 2

The procedure of Example 1 was repeated except that the first-pressing by the heat-resistant belt was not carried out, the pressing rolls were not cooled, and the foamed panel was annealed after being pressed by the rolls in the kiln at an atmosphere temperature of 400° C. to 600° C.

The same items as in Example 1 were observed or measured. The results are summarized in Table 1.

In Example 1, the first-pressed foam panel had net-like marks on both surfaces thereof due to the pressing by the belt. But the marks were vanished by the quenching of three rolls in the quenching zone, whereby the surface smoothness and dimensional accuracy of the panel were improved. By the contact cooling of the quenching rolls, the surface of the panel was solidified and shrunk to generate the thermal stress. The thermal stress was relaxed by passing the quenched panel in an annealing temperature of 530° C. to 550° C. more than strain point, so that the heat in the inner portion of the panel transferred to the surface portion of the panel to make uniform the temperature distribution in the panel. Thus, the porous ceramic panel without strain stress was obtained.

In Example 2, the first-pressed panel had net-like marks on the bottom surface thereof. Though the top surface of the panel was smooth on the whole, there was observed a wave pattern corresponding to the roll pitch. The net-like marks and wave pattern were almost vanished by the second-pressing of the quenching rolls.

In Example 3, the base layer was so designed to have large foaming expansion ratio that raw materials in the base layer foamed sufficiently to break the cell-interface. Thus, open void cells were not found in the base layer. In the surface layer, on the other hand, the foaming expansion ratio of raw materials was not enough to break open void cell remaining at cell-interface.

What we claim is:

1. In a method of producing a porous ceramic panel of superior dimensional accuracy and surface smoothness, wherein formable inorganic raw materials are heated and pressed in a kiln to produce the porous ceramic panel; the improvement wherein a foaming body of the inorganic raw materials is first-pressed in the kiln during a foaming step to ensure rough dimensional accuracy in a direction of the thickness of the panel, and after the foaming step the first-pressed foamed body is second-pressed in the kiln by pressing and cooling rolls disposed in an annealing zone of the kiln to obtain the desired dimensional accuracy and surface smoothness of the porous ceramic panel, which rolls directly contact a top surface and a bottom surface of the first-pressed foamed body to quench the foamed body in the kiln, and wherein the surface temperature of the quenched foamed body is raised again in an atmosphere of the annealing zone of the kiln to relax the thermal strain stress of the quenched foamed body thereby forming the porous ceramic panel of the desired dimensional accuracy and surface smoothness.

2. The method of claim 1, wherein the temperature of the annealing zone of the kiln is from 350° C. to 900° C.

3. The method of claim 1, wherein the first-pressing is carried out by at least one flat roll or a belt to smooth the whole surface of the porous ceramic panel, and the second-pressing is carried out by at least one embossing roll each having projecting portions corresponding to edge portions of the porous ceramic panel.

4. The method of claim 1, wherein the first-pressing and the second-pressing are carried out each, respectively, with at least one embossing roll each having projecting portions corresponding to edge portions of the porous ceramic panel.

5. The method of claim 1, wherein the first-pressing is carried out by a belt disposed parallel to a carrying passage in the kiln and the pressing and cooling rolls are disposed vertically to the carrying passage.

6. The method of claim 5, wherein the pressing rolls are embossing rolls.

7. The method of claim 1, wherein the first-pressing and the second-pressing are carried out by pressing rolls disposed vertical to a carrying passage of the kiln.

8. The method of claim 7, wherein the pressing rolls are embossing rolls.

9. The method of claim 1, wherein the porous ceramic panel consists of at least two layers comprising foamable inorganic raw materials having different compositions from one another, and the layers being integrated with one another during the heating and foaming step in the kiln.

10. The method of claim 9, wherein the layers comprise foamable inorganic raw materials having different foaming expansion ratios.

11. The method of claim 9, wherein foamable inorganic raw materials generating open void cells are used at least one surface layer of the porous ceramic panel.

12. The method of claim 9, wherein foamable inorganic raw materials comprising white raw materials and pigment are used in at least one surface layer, and foamable inorganic raw materials are used in the other layers.

13. The method of claim 9, wherein the layers comprise foamable inorganic raw materials having different particle sizes.

14. The method of claim 1, wherein the porous ceramic panel has a base layer comprising foamable inorganic raw materials and a colored layer coated on the base layer by means of a screen having shaped openings, the color of the colored layer being different from that of the base layer; and at least one of the first-pressing and second-pressing steps is carried out by at least one embossing roll having recessed portions corresponding to the colored layer in such a manner that the colored layer is made to protrude from the surface of the porous ceramic panel by the pressing of the embossing rolls.

15. The method of claim 14, wherein only the second-pressing is carried out by at least one embossing roll.

16. The method of any one of claims 14 or 15, wherein the screen has striped openings parallel to a longitudinal direction of the base layer.

17. The method of any one of claims 14 or 15, wherein the screen has striped openings perpendicular to a longitudinal direction of the base layer.

18. The method of any one of claims 14 or 15, wherein the screen has check-striped openings.

* * * * *